United States Patent Office 3,721,692
Patented Mar. 20, 1973

3,721,692
PROCESS OF SEPARATING YTTRIUM
FROM LANTHANIDES
Werner Fischer and Felix Schmitt, Hannover, Germany, assignors to Th. Goldschmidt A.G., Essen, Germany
No Drawing. Filed July 22, 1968, Ser. No. 746,298
Int. Cl. C07f 5/00
U.S. Cl. 260—429.2
2 Claims

ABSTRACT OF THE DISCLOSURE

Process of separating yttrium from lanthanides by solvent extraction, wherein their thiocyanates are distributed between an aqueous phase and an organic solvent phase, the thiocyanate:lanthanide ratio being at the most equal to the equivalent ratio. In accordance with the invention, the distribution is effected at a temperature below room temperature and preferably between $+5°$ C. and the cryohydric point of the aqueous phase.

SUMMARY OF THE INVENTION

This invention is concerned with a procedure for separating yttrium from dissolved rare earth elements—hereinafter referred to as lanthanides—by solvent extraction.

The lanthanides embrace the elements of atomic numbers 57 (lanthanum) through 71 (lutetium) and often occur in conjunction with yttrium which bears atomic number 39. Considerable difficulties have been encountered in separating the yttrium from the lanthanides.

It has previously been proposed to effect the separation of yttrium and lanthanides by solvent extraction, wherein their thiocyanates are distributed between an aqueous phase and an organic solvent phase, the thiocyanate:lanthanide ratio being at the most equal to the equivalent ratio.

Disclosure to this effect is contained, for example, in German Pat. No. 1,052,968. This German patent teaches that in the distribution of the lanthanides between an aqueous phase and an organic solvent phase in the presence of thiocyanates, the individual rare earth elements are distributed in the respective phases to a varying extent. In doing so and in the presence of yttrium, the latter, dependent on the quantity ratio of thiocyanate: lanthanide, assumes different positions in the lanthanide series. It has thus been found that if the thiocyanate is present in a large excess, for example, if the system is saturated with ammonium thiocyanate, the distribution of all the lanthanides from lanthanum to lutetium is increasingly in favor of the organic phase, the yttrium accompanying erbium. By contrast, upon decreasing thiocyanate concentration in the system, the yttrium changes is position in the lanthanide series in direction toward the lanthanum and behaves similar to the lightest lanthanides.

Based on this realization, yttrium can be separated from all the lanthanides with which it occurs together, by two subsequent process steps. One of these steps consists in a multi-stage countercurrent distribution by solvent extraction in the presence of a low thiocyanate concentration, whereby the first four elements of the series, to wit, lanthanum, cerium, praseodymium and neodymium, dependent on the particular conditions, are not or only partly separated from the yttrium, while the remaining heavier lanthanides, by contrast, are all separated from the yttrium in a substantially quantitative manner. In the second step, which may precede or follow the first-mentioned step, the elements lanthanum through neodymium are separated from the yttrium. This can effectively be performed by a multi-stage countercurrent distribution by solvent extraction with the system being saturated with thiocyanate, such as ammonium thiocyanate. However, this second step can also be carried out in a different manner by other known processes, for example by the known double sulfate precipitation.

It is the primary object of this invention to overcome the disadvantages of the prior art two-step separating procedure by providing a single-step solvent extraction procedure wherein the yttrium is substantially quantitatively separated from the lanthanides.

It is also an object of the invention to provide a process of the indicated kind which is simple to carry out and which is superior to the known processes for separating yttrium from lanthanides.

In accordance with this invention, it has been ascertained that cooling of the thiocyanate containing system below normal room temperature surprisingly causes a change in the position of the yttrium in the lanthanide series during the extraction to such an extent that the yttrium assumes a position beyond the lanthanum. In accordance with this invention, it has been found that the temperature-induced displacement or change of position of the yttrium relative to the lanthanide series is also influenced by the ratio of the amount of thiocyanate supplied to the distribution system to the amount of lanthanides. This ratio should be at the most equal to the equivalent ratio. In carrying out the inventive procedure, an excellent separating effect is thus obtained and the yttrium is the only element of the system which is enriched in the aqueous phase, while all the lanthanides accumulate in the organic phase.

In developing the invention, it has been ascertained that the separation is most advantageously carried out in a temperature range between $+5°$ C. and the cryohydric point of the aqueous phase.

Experiments have indicated that particularly advantageous results are obtained if the lanthanides to be separated are supplied to the system in the form of an aqueous chloride solution.

According to a preferred embodiment of the inventive process, the required amount of thiocyanate is supplied to the system in the form of a readily soluble thiocyanate and is charged to one end of a multi-stage distribution or solvent extraction plant. Suitable thicyanates for this purpose are ammonium thiocyanate and alkali metal thiocyanate.

If the inventive procedure is carried out in a multi-stage countercurrent solvent extraction plant, it is advantageous to operate with partial reflux.

Table 1 below lists several separating factors. The distribution coefficient $\alpha$ is defined as the quotient obtained from the analytical concentration of an element in the organic phase and in the aqueous phase, to wit, $$\alpha = \frac{c_o}{c_w},$$

while the separating factor $\beta_{A,B}$ of the two elements A and B means the quotient of their distribution coefficients $$\beta_{A,B} = \frac{\alpha A}{\alpha B}$$

The numerical values of Table 1 were obtained in the following manner: aqueous lanthanide chloride solutions of a pH value of 3 to 5, which in each case contained a mixture of yttrium and a lanthanide element in a 1.3 molar concentration, were brought into equilibrium with an equal volume of an organic phase. The organic phase contained two parts by volume of tri-n-butyl phosphate and one part by volume of kerosene as well as 0.37 mole of $NH_4SCN$ per liter. The values listed in the Table were obtained by analyzing the two phases upon completion of the extraction.

The separating factors increase with decreasing temperature to such an extent that it was possible to separate the yttrium from all lanthanides in a single run of the solution through a multi-stage countercurrent solvent extraction plant, the yttrium-lanthanide mixture having been obtained from naturally occurring yttrium-lanthanide sources. This is demonstrated more in detail in the following examples.

TABLE 1

[Separating factors $\beta_{A,B}$ at different temperatures under the conditions indicated hereinabove]

| Temp., °C | $\beta_{La,Y}$ | $\beta_{Ce,Y}$ | $\beta_{Nd,Y}$ | $\beta_{Gd,Y}$ |
|---|---|---|---|---|
| +40 | | | 1.00 | |
| +30 | | | 1.40 | |
| +20 | 1.02 | 1.62 | 1.65 | 2.40 |
| +10 | | | 2.16 | |
| +2.5 | 1.80 | 2.23 | 2.70 | 2.70 |
| −7 | 3.02 | | | |

It was found that in operating in accordance with the inventive procedure, also the heavier lanthanides, to wit, terbium through lutetium, are more effectively separated from the yttrium than the lanthanum. Other elements, for example beryllium, calcium, scandium, thorium, manganese and copper, accompany the lanthanides and are thus also effectively separated from the yttrium.

In respect to the organic solvent of the organic phase, oxygen containing solvents as, for example, esters, ethers and ketones, are suitable. More viscous solvents such as, for example, phosphoric acid esters, are advantageously diluted, in known manner, with an inert second solvent such as, for example, a higher boiling hydrocarbon. Tertiary esters of phosphoric acid whose hydrocarbon groups contain 3–8 carbon atoms are particularly suitable organic solvents for the purposes of this invention.

The invention will now be described by several examples, it being understood, however, that these examples are given by way of illustration and not by way of limitation and that many changes may be effected without affecting in any way the scope and spirit of the appended claims.

EXAMPLE 1

This experiment was carried out in a counter-current solvent extraction plant which had 20 stages. Each stage consisted of a mixer-settler as described by Werner Fischer and Otto Jübermann in "Chemie-Ingenieur-Technik," volume 23, p. 299 (1951), FIG. 3. The plant was operated as follows: The starting material was an aqueous chloride solution of a mixture of yttrium and lanthanides, the solution having a pH value of about 4. The solution contained 0.67 mole lanthanide chloride per liter. Calculated on 100 lanthanide atoms, the mixture contained 2.1 La, 8.3 Ce, 1.4 Pr, 7.1 Nd, 37.7 Y; the residue consisted of the elements samarium through lutetium. This solution was fed to the 14th stage of the system with a rate of 0.24 liter per hour, while 0.36 liter per hour of aqueous "reflux solution," to be defined hereinbelow, were supplied to stage 20. Stage 1 was supplied with 1.5 liters per hour of the organic phase. The organic phase consisted of tri-n-butyl phosphate and a high boiling petroleum fraction in a volume ratio of 2:1 and contained 0.7 mole of $NH_4SCN$ per liter. The organic phase discharged from stage 20 was re-extracted with 3 N aqueous hydrochloric acid. The lanthanide chloride solution obtained thereby, and after adjustment of its pH value to about 3 to 4, was adjusted to a concentration of 0.67 mole of lanthanide chloride per liter. The solution thus obtained partially served as the "reflux solution" for stage 20 previously referred to, while the rest was recovered as the lanthanide containing fraction. The aqueous solution obtained from stage 1 contained the yttrium fraction. By conducting the procedure at a temperature of 20° C., the composition of the aqueous fraction in atom percent is as follows: 5.2 La, 1.5 Ce, 0.3 Pr, 1.1 Nd, remainder Y. The yttrium yield amounted to more than 99%. By contrast, in operating under ice cooling so that the temperature is below +5° C., the yttrium fraction in atom percent had the following composition: 0.1 La and 0.02 Ce. The amount of the other lanthanides was below the detection range. The yttrium yield amounted to 98%.

EXAMPLE 2

This experiment was carried out in a counter-current solvent extraction plant consisting of 12 mixer-settlers of the same kind as used in Example 1. The starting yttrium-lanthanide mixture contained, calculated on 100 parts by weight of the mixture of yttrium and lanthanide oxides, 0.1% $La_2O_3$, 0.08% $Pr_6O_{11}$, 0.34% $Nd_2O_3$ and 74.6% $Y_2O_3$. The remainder consisted of the elements samarium through lutetium. This oxide mixture was dissolved in hydrochloric acid to a 1.2 molar aqueous solution of a pH value of 4. This solution was fed to stage 10 of the plant with a rate of 0.10 liter per hour. Stage 12 was supplied with 0.15 liter per hour of aqueous reflux solution, which stage 1 received 1.35 liters per hour of organic phase. The organic phase consisted of tri-n-butyl phosphate and kerosene in a volume ratio of 2:1 and contained 0.45 mole of $NH_4SCN$ per liter. The organic phase discharged from stage 12 was re-extracted with hydrochloric acid as in Example 1. The aqueous extract served partially as 1.2 molar lanthanide chloride reflux solution. When the plant was operated at a temperature of about 20° C., the yttrium oxide fraction obtained from stage 1 contained 0.1% $La_2O_3$, 0.05% $Pr_6O_{11}$, and 0.07% $Nd_2O_3$. By contrast, in operating the plant at a temperature of about 0° C., traces of Pr are no longer detectable at stage 6 while no presence of Nd could be demonstrated in stage 3 and no content of La could be found at stage 1. Also the other lanthanides could no longer be detected in stage 1. The yttrium yield amounted at both temperatures to 96%.

What is claimed is:

1. In a one-step process of separating yttrium from lanthanides, wherein an aqueous solution of a mixture of the chlorides of yttrium and of at least one lanthanide, including at least one lanthanide selected from the group consisting of lanthanum, cerium, praseodymium and neodymium, at a concentration of at least ⅓ mole $ECl_3$, wherein E stands for a mixture of yttrium and lanthanides, per litre is contacted with a substantially water-immiscible organic trialkylphosphate containing medium which contains dissolved thiocyanate values in a concentration of at the most 1 mole SCN per litre, and the resulting organic phase is separated from the resulting aqueous phase, the improvement which comprises that contacting and the separation of the phases are effected at a temperature below 20° C. whereby the extractability of yttrium is lower than that of all the lanthanides.

2. The improvement as claimed in claim 1, wherein the contacting and the separation of the phases are effected at a temperature between about +5° C. and the cryohydric point of the aqueous phase.

References Cited

UNITED STATES PATENTS

| 3,492,084 | 1/1970 | Troube et al. | 23—23 X |
| 2,955,913 | 10/1960 | Pepford et al. | 23—23 |
| 3,276,849 | 10/1966 | More | 23—340 |

FOREIGN PATENTS

| 1,052,968 | 3/1959 | Germany. |

OTHER REFERENCES

Siekierski: "Extractions From Solutions . . . ", J. Inorganic Nuclear Chemistry, 12, 129—135 (1959).

CARL D. QUARFORTH, Primary Examiner

E. A. MILLER, Assistant Examiner

U.S. Cl. X.R.

23—19, 23

UNITED STATES PATENT OFFICE
CERTIFICATE OF CORRECTION

Patent No. 3,721,692          Dated   March 20, 1973

Inventor(s) Werner Fischer, et al.

It is certified that error appears in the above-identified patent and that said Letters Patent are hereby corrected as shown below:

In the heading to the printed specification, after line 6, insert:

August 8, 1967     Germany . . . P 15 92 120.7

Signed and sealed this 4th day of December 1973.

(SEAL)
Attest:

EDWARD M. FLETCHER, JR.          RENE D. TEGTMEYER
Attesting Officer                Acting Commissioner of Patents